United States Patent
Oguro (10) Patent No.: US 9,612,410 B2
(45) Date of Patent: Apr. 4, 2017

(54) OPTICAL TRANSMISSION/RECEPTION MODULE

(71) Applicant: NEC Corporation, Tokyo (JP)

(72) Inventor: Mamoru Oguro, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 14/904,056

(22) PCT Filed: Jul. 7, 2014

(86) PCT No.: PCT/JP2014/003588
§ 371 (c)(1),
(2) Date: Jan. 8, 2016

(87) PCT Pub. No.: WO2015/008451
PCT Pub. Date: Jan. 22, 2015

(65) Prior Publication Data
US 2016/0170156 A1 Jun. 16, 2016

(30) Foreign Application Priority Data

Jul. 18, 2013 (JP) ................. 2013-149557

(51) Int. Cl.
*G02B 6/42* (2006.01)
*G02B 6/125* (2006.01)
*G02B 6/12* (2006.01)

(52) U.S. Cl.
CPC .......... *G02B 6/4206* (2013.01); *G02B 6/125* (2013.01); *G02B 6/42* (2013.01); *G02B 6/4214* (2013.01);
(Continued)

(58) Field of Classification Search
CPC .. G02B 6/4206; G02B 6/4286; G02B 6/4214; G02B 6/42; G02B 6/4215; G02B 6/125; G02B 6/4246
See application file for complete search history.

(56) References Cited

U.S. PATENT DOCUMENTS 5,321,779 A   6/1994 Kissa
6,351,575 B1* 2/2002 Gampp ................. G02B 6/126
                                                 385/14
(Continued)

FOREIGN PATENT DOCUMENTS

JP   H 04-321005 A   11/1992
JP   H11-248954 A    9/1999
(Continued)

OTHER PUBLICATIONS

International Search Report (ISR) (PCT Form PCT/ISA/210), in PCT/JP2014/003588, dated Sep. 22, 2014.
(Continued)

*Primary Examiner* — Ryan Lepisto
(74) *Attorney, Agent, or Firm* — McGinn IP Law Group, PLLC (57) ABSTRACT

An optical transmission/reception module includes a substrate, a light-receiving element provided on said substrate, a light source provided on the substrate, an optical waveguide that is formed on the substrate and has a turnaround point, and a filter positioned between the optical waveguide and the light-receiving element. The optical waveguide is optically connected to the light source at one end and is optically connected to the light-receiving element at the turnaround point. There is a stray-light elimination section in the substrate between the light-receiving element and the aforementioned one end of the optical waveguide.

14 Claims, 6 Drawing Sheets

(52) U.S. Cl.
CPC ......... *G02B 6/4215* (2013.01); *G02B 6/4246* (2013.01); *G02B 6/4286* (2013.01); *G02B 2006/121* (2013.01)

(56) References Cited

U.S. PATENT DOCUMENTS

| | | | | |
|---|---|---|---|---|
| 6,385,375 | B1 * | 5/2002 | Goto | G02B 6/4246 385/49 |
| 7,366,372 | B2 * | 4/2008 | Lange | G02B 6/125 385/129 |
| 8,953,913 | B2 * | 2/2015 | Guattari | G02B 6/122 385/14 |
| 9,081,136 | B2 * | 7/2015 | Lefevre | G02B 6/12004 |
| 2002/0001427 | A1 * | 1/2002 | Hashimoto | G02B 6/4246 385/14 |

FOREIGN PATENT DOCUMENTS

| | | |
|---|---|---|
| JP | 2000-075155 A | 3/2000 |
| JP | 2001-264553 A | 9/2001 |
| JP | 2002-090560 A | 3/2002 |
| JP | 2005-004204 A | 1/2005 |
| JP | 2006-276518 A | 10/2006 |
| JP | 2007-272121 A | 10/2007 |

OTHER PUBLICATIONS

Written Opinion of the ISA in PCT/JP2014/003588, dated Sep. 22, 2014.
Japanese Office Action dated Sep. 13, 2016 with an English translation thereof.

* cited by examiner

OPTICAL TRANSMISSION/RECEPTION MODULE

TECHNICAL FIELD

The present invention relates to an optical transmission/reception module, and in particular, relates to an optical transmission/reception module provided with a configuration for reducing stray light.

BACKGROUND ART

A fiber optic communication system in widespread use includes mainly a transmitter, an optical fiber corresponding to a transmission line, and a receiver.

At a point of connection between an optical waveguide type transmitter and an optic fiber, an optical signal transformed from an electrical signal is inputted from an optical waveguide within the transmitter to the optical fiber. The optical signal inputted to the optical fiber is then transmitted by the optical fiber. At a point of connection between an optical waveguide type receiver and the optic fiber, the transmitted optical signal is inputted to an optical waveguide of the receiver. The optical signal inputted to the optical waveguide is then inputted to a light receiving element such as a photo diode (PD), where the optical signal is transformed to an electrical signal.

In an optical transmission/reception module into which the above-described receiver and transmitter are modularized together, a plurality of optical devices are arranged on an optical waveguide within the module. The plurality of optical devices include a laser diode (LD) corresponding to a light source, a PD corresponding to a light receiving element, and the like.

In an optical transmission/reception module provided with such a configuration, out of an optical signal emitted from the light source, a light component not having been coupled into the optical waveguide becomes "stray light". The stray light propagates outside or inside the substrate of the optical waveguide. In particular, the stray light propagating inside the substrate becomes a cause of increasing noise in the signal, as a result of its reentering the optical waveguide or entering the light receiving element connected to the optical waveguide.

In relation to this problem, technologies described in the following Patent Literature 1 to Patent Literature 3 have been known as methods for eliminating stray light generated as described above.

Figure 6:
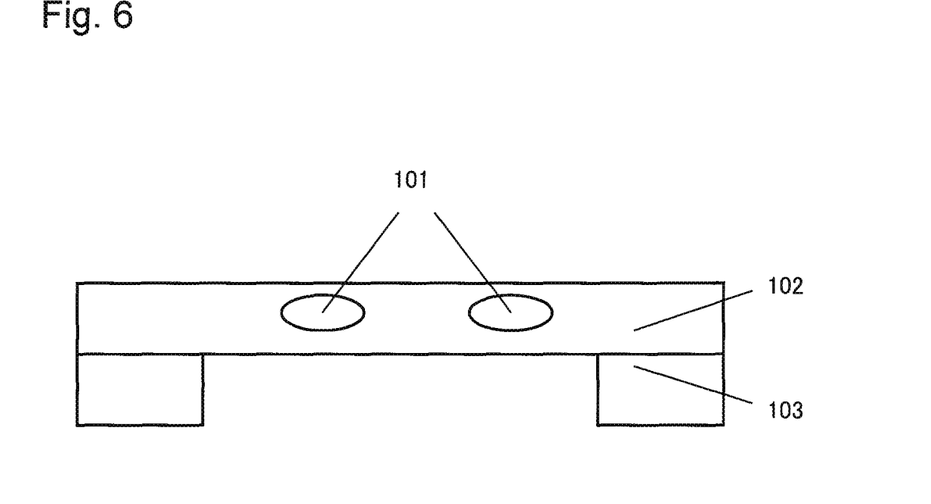

FIG. 6 is a diagram showing a cross section of an optical modulator described in Patent Literature 1. In Patent Literature 1, the optical modulator is described as one in which an optical waveguide 101 is formed on the top or bottom surface of a thin plate 102 and a stray light elimination means (light absorption section 103 in FIG. 6) is arranged within or close to the thin plate 102.

Figure 7:
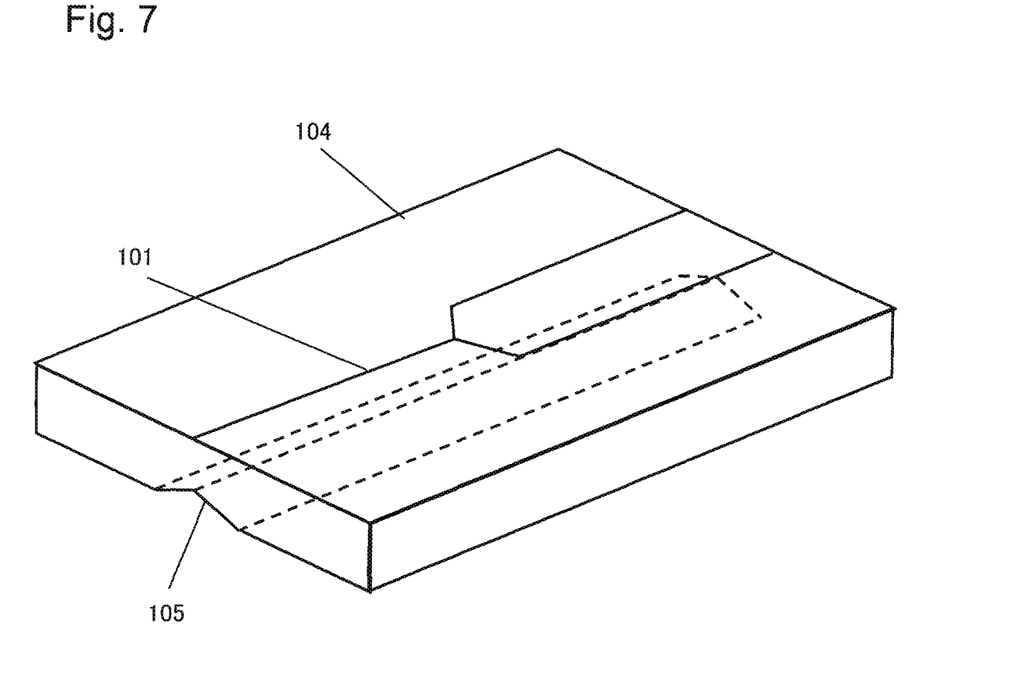
FIG. 7 A diagram showing an optical IC described in Patent Literature 2

FIG. 7 is a diagram showing an optical IC (integrated circuit) described in Patent Literature 2. In the optical IC of FIG. 7, an optical waveguide 101 is formed on the top surface of a substrate 104, and a groove (triangular groove 105) running approximately in parallel with the optical waveguide 101 is formed at the bottom surface of the substrate 104 in a manner to be approximately opposed to the optical waveguide 101. Surfaces constituting the groove (triangular groove 105) are not perpendicular or parallel to the bottom surface of the substrate 104. Patent Literature 3 describes an optical device provided with a stray light reflection means for guiding stray light outside a thin plate on which an optical waveguide is formed.

CITATION LIST

Patent Literature

Patent Literature 1: Japanese Patent Application Laid-Open No. 2006-276518
Patent Literature 2: Japanese Patent Application Laid-Open No. 2001-264553
Patent Literature 3: Japanese Patent Application Laid-Open No. 2007-272121

SUMMARY OF INVENTION

Technical Problem

In a case where a light source for transmission and a light receiving element for reception are arranged on the same substrate of an optical transmission/reception module, it is possible that stray light generated at a time of light emission of the light source enters the light receiving element after propagating inside the substrate. However, to an optical transmission/reception module having such a configuration, the technologies for eliminating stray light of Patent Literature 1 to Patent Literature 3 cannot be applied, for the following reasons The stray light elimination means in Patent Literature 1 (in FIG. 6, the light absorption unit 103) is mainly arranged along the optical waveguide 101. Accordingly, the stray light elimination means described in Patent Literature 1 can effectively eliminate only stray light within the thin plate 102, on which the optical waveguide 101 is formed, and stray light traveling in a direction perpendicular to the longitudinal direction of the optical waveguide 101.

The groove in Patent Literature 2 (in FIG. 7, the triangular groove 105) also is arranged along the optical waveguide 101, and it reflects a stray light component traveling perpendicularly to the longitudinal direction of the optical waveguide 101, among the stray light components. Further, the stray light reflection means described in Patent Literature 3 also is arranged along the longitudinal direction of the optical waveguide. Accordingly, also the configurations described in Patent Literature 2 and Patent Literature 3 can effectively eliminate only stray light traveling in a direction perpendicular to the longitudinal direction of the optical waveguide.

For these reasons, in an optical transmission/reception module having the above-described configuration, even when the configurations described in Patent Literature 1 to Patent Literature 3 are applied to it, it is still possible that stray light generated at a time of emission of an optical signal for transmission from the light source enters the light receiving element after propagating inside the substrate. As a result, in a case of Full-Duplex operation where transmission and reception are simultaneously performed, it is likely that noise is added to a signal received by the light receiving element, and accordingly, the reception sensitivity of the light receiving element is deteriorated.

The objective of the present invention is to solve the above-described problem and accordingly to provide an optical transmission/reception module which reduces the deterioration of the reception sensitivity of the light receiving element.

Solution to Problem

An optical transmission/reception module of the present invention comprises a substrate, a light receiving element provided on the substrate, a light source provided on the substrate, an optical waveguide formed on the substrate and having a turnaround point, and a filter arranged between the optical waveguide and the light receiving element, wherein the optical waveguide is optically connected with the light source at its one end and with the light receiving element at the turnaround point, and a stray light elimination section is provided in a part of the substrate between the light receiving element and the one end of the optical waveguide.

Advantageous Effect of Invention

The optical transmission/reception module of the present invention can reduce deterioration of the reception sensitivity of the light receiving element.

DESCRIPTION OF EMBODIMENTS

First Exemplary Embodiment

Hereinafter, an exemplary embodiment of the present invention will be described using drawings. However, the exemplary embodiment does not limit the scope of the present invention.

[Description of Configuration]

Figure 1A:
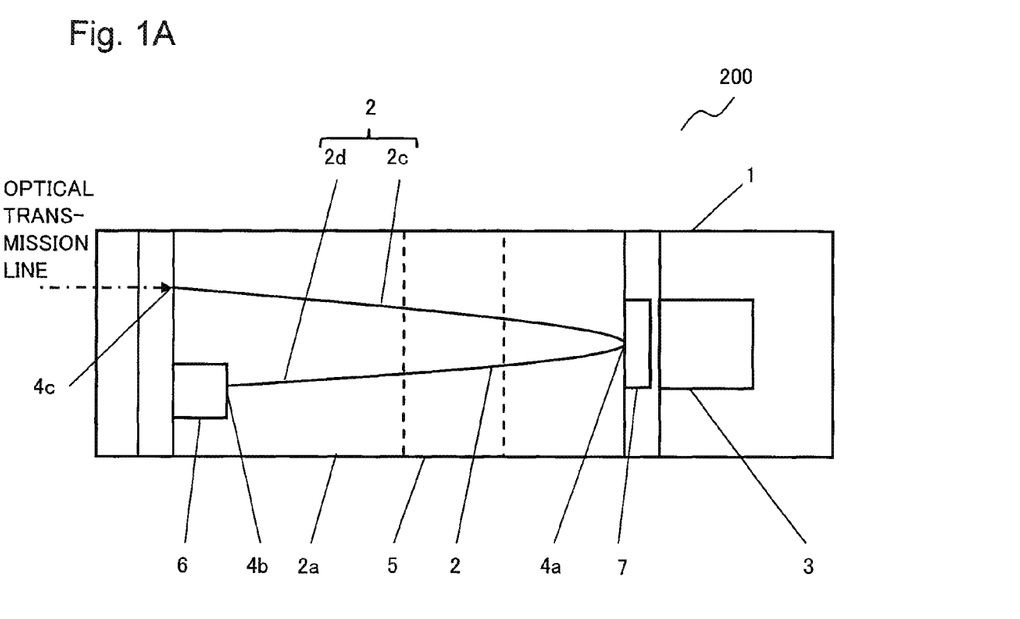
FIG. 1A A top view of an optical transmission/reception module in a first exemplary embodiment of the present invention FIG. 1B A side view of the optical transmission/reception module in the first exemplary embodiment of the present invention FIG. 2A A bottom view of an optical transmission/reception module in which another type of stray light elimination section is adopted, in the first exemplary embodiment of the present invention FIG. 2B A side view of the optical transmission/reception module in which another type of stray light elimination section is adopted, in the first exemplary embodiment of the present invention FIG. 3A A bottom view of an optical transmission/reception module in which still another type of stray light elimination section is adopted, in the first exemplary embodiment of the present invention FIG. 3B A side view of the optical transmission/reception module in which still another type of stray light elimination section is adopted, in the first exemplary embodiment of the present invention FIG. 4A A top view showing an example where an optical transmission/reception module is covered with a light absorption material, in the first exemplary embodiment of the present invention FIG. 4B A side view showing the example where an optical transmission/reception module is covered with a light absorption material, in the first exemplary embodiment of the present invention FIG. 5A A top view showing an example of an optical transmission/reception module of the present invention FIG. 5B A side view showing the example of an optical transmission/reception module of the present invention FIG. 6 A diagram showing a cross section of an optical modulator described in Patent Literature 1
Figure 1B:
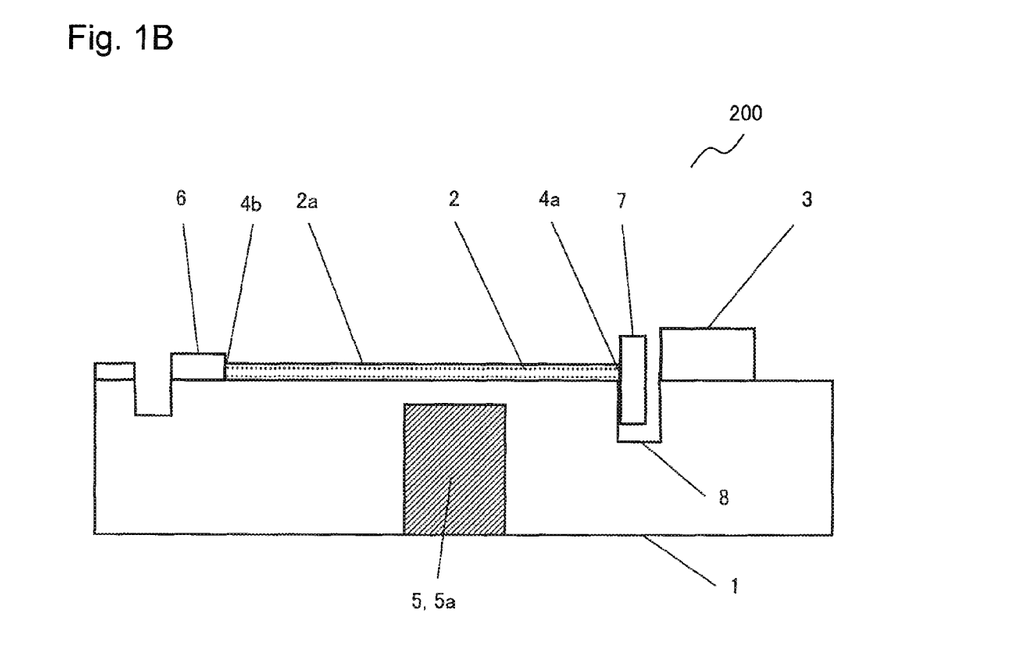

FIGS. 1A and 1B are a top view and a side view, respectively, of an optical transmission/reception module 200 in the present exemplary embodiment. The optical transmission/reception module 200 of the first exemplary embodiment comprises a substrate 1, an optical waveguide 2, a light receiving element 3, a stray light elimination section 5, a light source 6 and a filter 7.

As shown in FIG. 1A, the optical waveguide 2 formed on the substrate 1 has a turnaround point 4a, one end 4b and the other end 4c. The light receiving element 3 is arranged on the substrate 1 and is optically connected with the optical waveguide 2 at the turnaround point 4a. The light receiving element 3 receives light having been transmitted through the optical waveguide 2, at the turnaround point 4a via the filter 7. The light source 6 is arranged on the substrate 1. The light source 6 is optically connected with the optical waveguide 2 at the one end 4b. Emitted light from the light source 6 is coupled into the optical waveguide 2 at the one end 4b and then propagates in the optical waveguide 2. At the other end 4c, the emitted light having propagated in the optical waveguide 2 is coupled into an optical transmission line outside the module, and then is transmitted in the optical transmission line. The filter 7 is arranged between the turnaround point 4a of the optical waveguide 2 and the light receiving element 3. The filter 7 passes light having entered the optical waveguide 2 from the optical transmission line outside the module. On the other hand, the filter 7 totally reflects emitted light from the light source 6.

Of the optical waveguide 2, a portion ranging from the filter 7 to the other end 4c is referred to as an optical waveguide 2c, and that from the one end 4b to the filter 7 as an optical waveguide 2d. The incident light having passed through the filter 7 is received by the light receiving element 3. On the other hand, the emitted light having been totally reflected by the filter 7 propagates through the optical waveguide 2c, and then at the other end 4c, it becomes incident on the optical transmission line or the like outside the module.

Further, as shown in FIG. 1B, a stray light elimination section 5 is arranged in a part of the substrate 1 between the light receiving element 3 and the one end 4b of the optical waveguide 2.

In the following, specific configurations and materials which can be adopted in the optical transmission/reception module 200 will be described.

As the substrate 1, a Si substrate 1a can be used, as will be described later using FIGS. 5A and 5B.

The optical waveguide 2 may be configured with a planer lightwave circuit (PLC) in which a core corresponding to the optical waveguide 2 is embedded in a clad. The optical waveguide 2 illustrated in FIGS. 1A and 1B may be configured with a PLC whose clad material is $SiO_2$. As will be described later using FIGS. 5A and 5B, as materials of the PLC, an $SiO_2$ layer 2a may be used for the clad, and $SiO_2$—$GeO_2$ glass for the core. For example, a pattern of the core of $SiO_2$—$GeO_2$ glass is formed on the $SiO_2$ layer 2a by photolithography and known process technology. Besides those described above, any other known materials and fabrication methods for forming the optical waveguide 2 may also be adopted.

As the light receiving element 3, a PD or an APD (avalanche photodiode) may be used. Any other known optical sensor also may be used as the light receiving element 3.

As shown in FIG. 1B, the stray light elimination section 5 is provided, as a groove 5a, in a part of the substrate 1 between the light receiving element 3 and the one end 4b.

The stray light elimination section 5 cuts off stray light propagating inside the substrate 1. The groove 5a may be formed to be approximately perpendicular to the longitudinal direction of the optical waveguide 2 and to extend over the whole width of the substrate 1. By a surface of the groove 5a, which is approximately perpendicular to the substrate 1, stray light having a component travelling in the longitudinal direction of the optical waveguide 2 is reflected. Further, by filling the groove 5a with a light absorption material for absorbing stray light, a high refractive index material for refracting stray light in a manner to prevent the stray light from being incident on the light receiving element 3, or the like, a larger effect of cutting off stray light can be achieved. FIG. 1B shows a case of filling the groove 5a with a light absorption material, a high refractive index material or the like, as just described above. However, the groove 5a may be filled with nothing and be in a state of having only air within it.

Figure 2A:
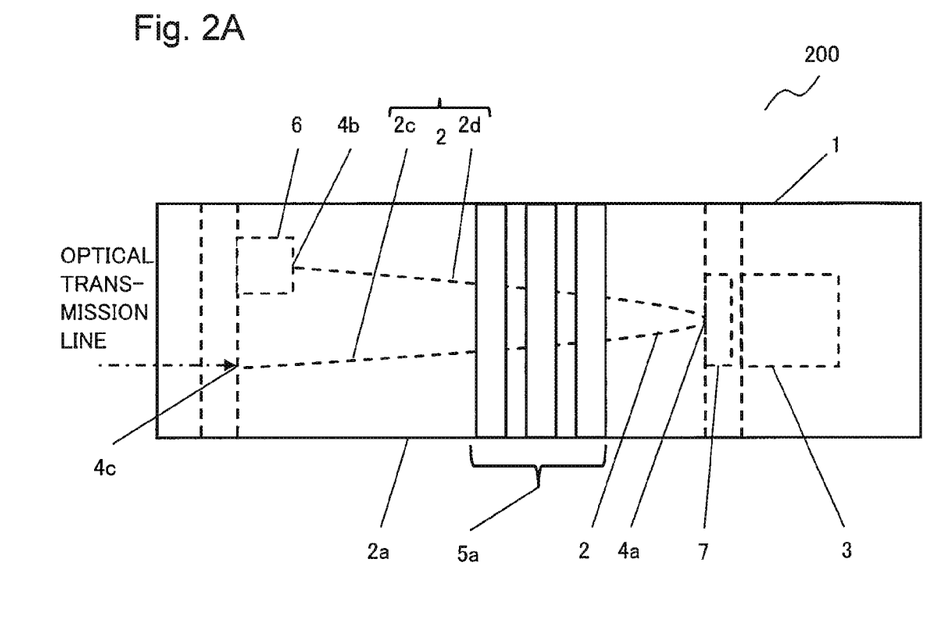
Figure 2B:
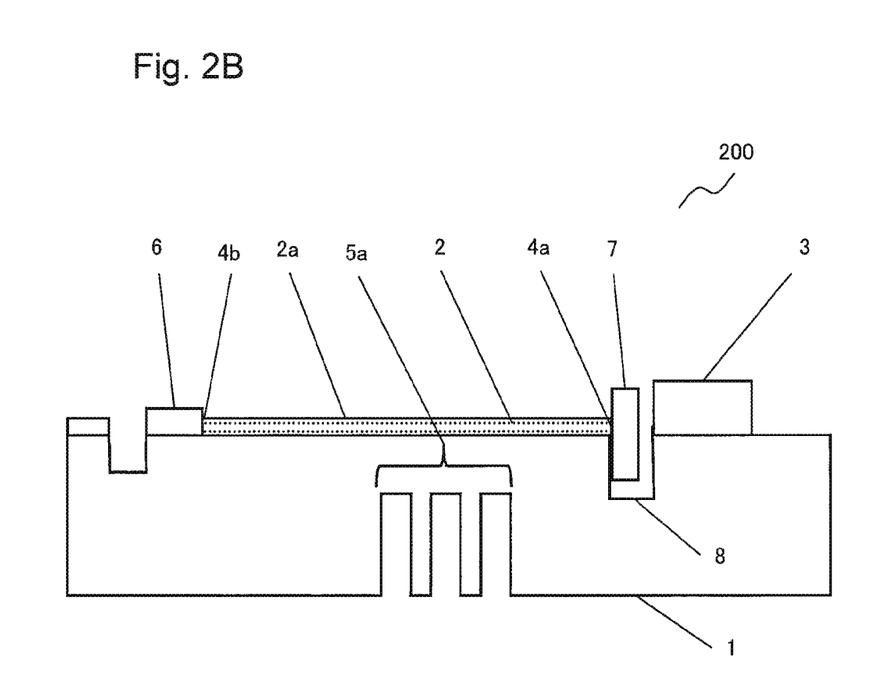

FIGS. 2A and 2B are a bottom view and a side view, respectively, of an optical transmission/reception module, in the first exemplary embodiment, where another type of stray light elimination section is adopted. As shown in FIGS. 2A and 2B, a plurality of grooves 5a may be arranged along the longitudinal direction of the optical waveguide 2. Thus arranging a plurality of grooves 5a results in a situation where a large number of surfaces exist on a path through which stray light reaches the light receiving element 3, and it accordingly becomes possible to perform stray light elimination a plurality of times. As a result, in such a case of arranging a plurality of grooves 5a as the stray light elimination section 5, the effect of reducing the influence of stray light, which is achieved by stray light's being reflected by the surfaces of the grooves 5a, becomes larger. Further, when the grooves 5 are filled with a light absorption material, a larger effect of absorbing stray light is achieved.

Figure 3A:
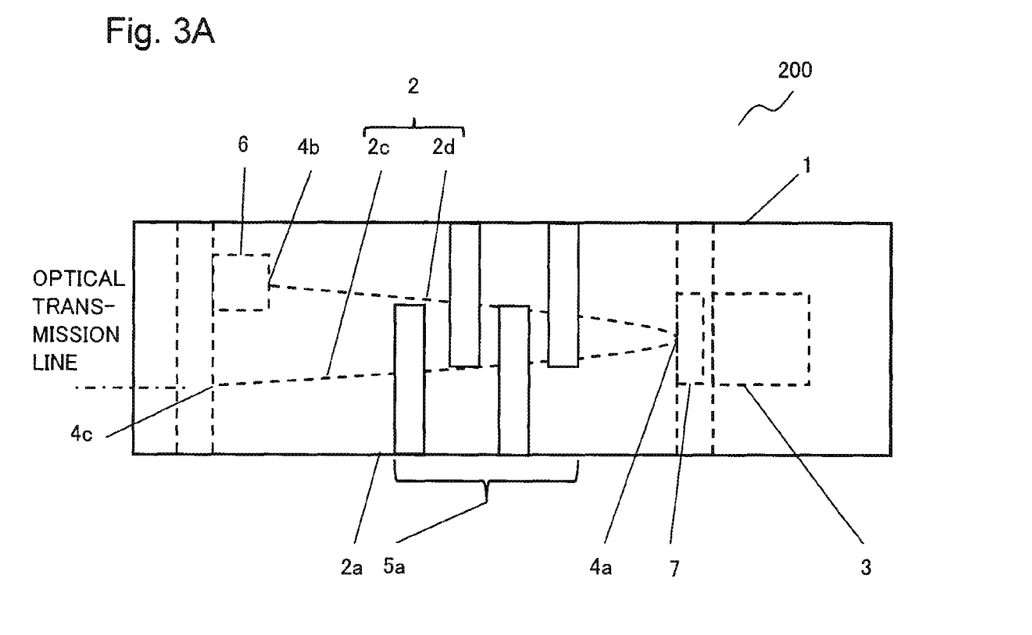
Figure 3B:
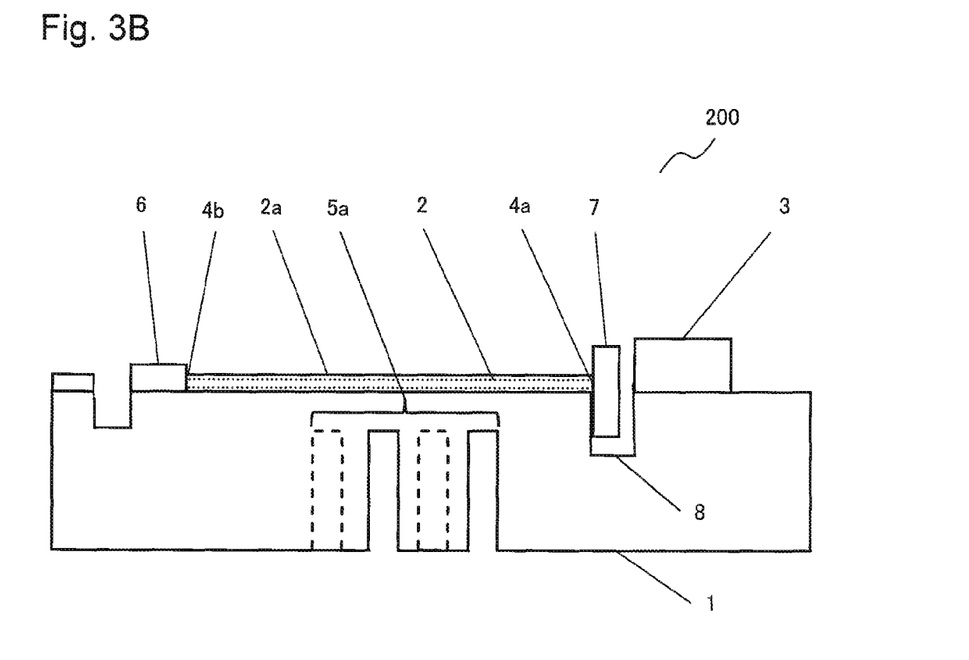

FIGS. 3A and 3B are a bottom view and a side view, respectively, of an optical transmission/reception module, in the first exemplary embodiment, where still another type of stray light elimination section is adopted. In FIGS. 1A, 1B, 2A and 2B, the grooves 5a are formed to extend over the whole width of the substrate 1. However, the groove configuration may be such that grooves 5a with a smaller length than the whole width of the substrate 1 are arranged alternately at one and the other side surfaces of the substrate 1. By thus providing the grooves 5a in a manner to be arranged alternately, prevention of strength decrease of the substrate 1 can be achieved simultaneously with stray light reduction.

Further, when members such as the grooves 5a are arranged alternately, it is effective, for suppressing the influence of stray light and preventing strength decrease of the substrate 1, to arrange all of the grooves 5a alternately, as illustrated in FIGS. 3A and 3B. However, if at least one pair of alternately arranged grooves 5a is present, the effect of suppressing the influence of stray light and preventing strength decrease of the substrate 1 is achieved. Further, a larger effect of cutting off stray light is achieved if the grooves 5a, which are arranged alternately at one and the other side surfaces of the substrate 1, are arranged in a manner to cooperatively constitute one surface extending over the whole width of the substrate 1 when they are viewed from the one end 4b of the optical waveguide 2, which is a point of stray light generation, into the direction toward the light receiving element 3.

Further, stray light may be scattered by making the surfaces constituting the grooves 5a have unevenness (including a rough surface). Alternatively, stray light may be guided into a direction other than that toward the light receiving element 3, by arranging a light guiding section for guiding the stray light which has the same configuration as that of the optical waveguide 2, as the stray light elimination section 5. Also as the stray light elimination section 5, something capable of preventing stray light propagating inside the substrate 1 from reaching the light receiving element 3 may be adopted. Further, a plurality of ones of the above-described specific examples or known examples of the stray light elimination section 5 may be combined together.

The stray light elimination section 5 may be arranged only at a location where stray light is highly likely to pass through. For example, the stray light elimination section 5 may be arranged only just beneath the optical waveguide 2d and around there. The stray light elimination section 5 does not necessarily need to have a rectangular parallelepiped shape as shown in FIG. 1A, and may be arranged in any shape at a height and a location which make it possible to cut off stray light traveling inside the substrate 1.

Here, an LD 6a may be used as the light source 6.

As the filter 7, a known optical demultiplexer, such as an optic fiber or a dielectric multilayer film filter functioning as a WDM (wavelength division multiplexing) filter 7a, may be adopted.

In the case of the optical transmission/reception module 200 having the arrangement shown in FIG. 1A, optical characteristics of the filter 7 with respect to received optical signals and transmitted optical signals (whether to pass or totally reflect the signals) are as described before. Alternatively, the filter 7 of another type having different optical characteristics may be adopted, on the basis of arrangements of the light receiving element 3 and the light source 6 with respect to a surface of the filter 7 on which the optical signals are to be incident. That is, the adopted filter 7 may be that of a type which makes received optical signals be incident on the light receiving element 3 and makes optical signals to transmit be incident on an optical transmission line or the like outside the device but not incident on the light receiving element 3.

Figure 4A:
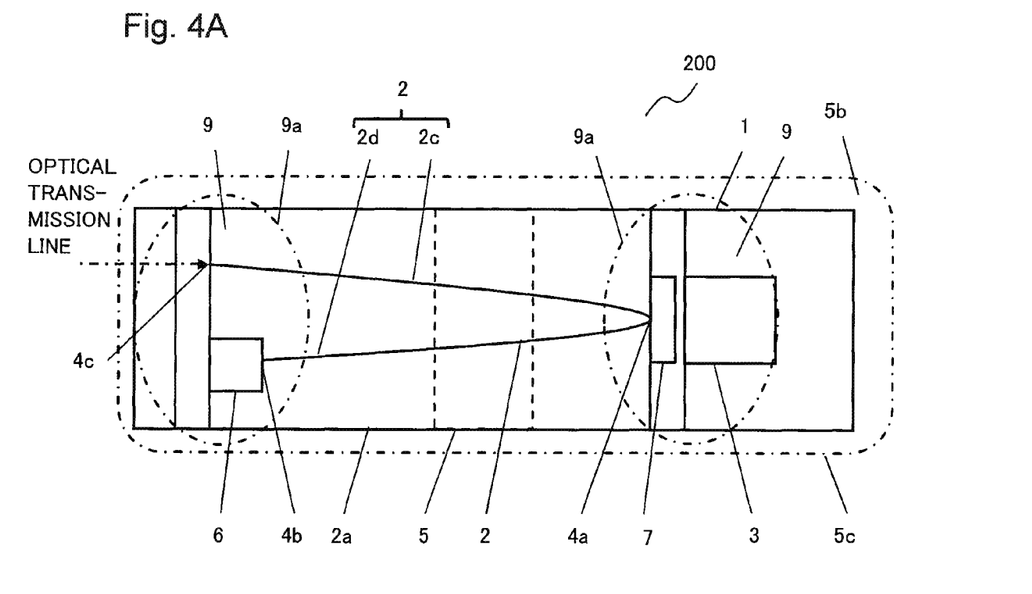
Figure 4B:
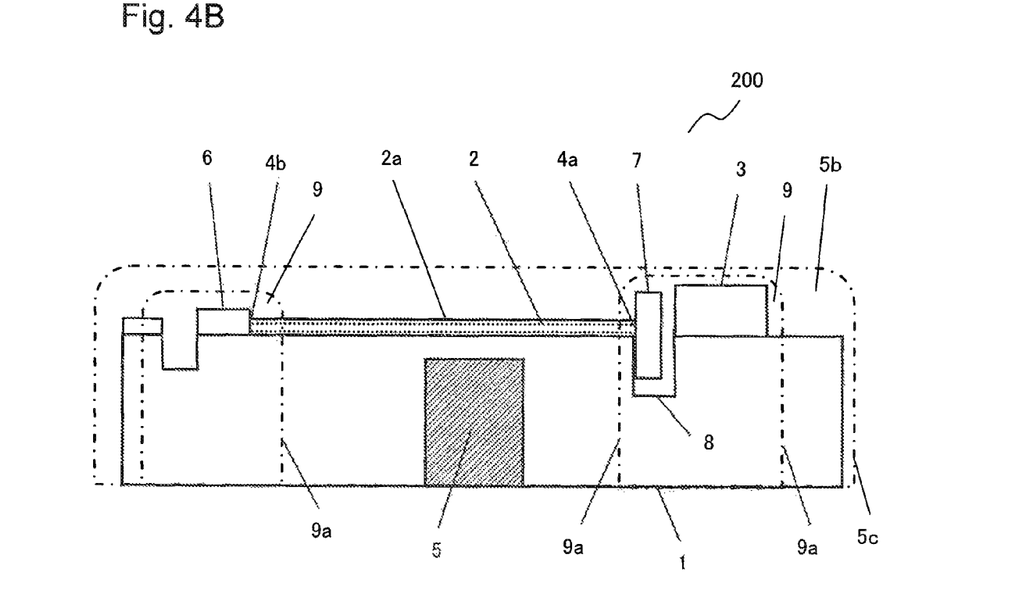

FIGS. 4A and 4B are a top view and a side view, respectively, showing an example in which the optical transmission/reception module in the first exemplary embodiment is covered with a light absorption material. A region enclosed by a dashed-dotted line 5c, in FIGS. 4A and 4B, shows a region where a light absorption material 5b is applied. A region enclosed by a dashed-dotted line 9a, in FIGS. 4A and 4B, shows a region where a transparent resin 9 is applied.

As shown in FIGS. 4A and 4B, in addition to arranging the stray light elimination section 5, a light absorption material 5b may be applied in a manner to entirely cover the optical transmission/reception module 200, in order to absorb stray light including that radiated outside the substrate 1.

Before the light absorption material 5b is applied, the transparent resin 9 is applied between the one end 4b of the optical waveguide 2 and the light source 6, between the turnaround point 4a of the optical waveguide 2 and the filter 7, and between the filter 7 and the light receiving element 3. The transparent resin 9 is further applied between the optical transmission line outside the module and the other end 4c of the optical waveguide 2, and also onto the light receiving element 3 and the light source 6, before the light absorption material 5b is applied. The purpose of coating the above-described portions with the transparent resin 9 is to prevent the light absorption material 5b from entering the optical path. The transparent resin 9 is applied such that the light receiving element 3 and the light source 6 are not optically coupled with each other through the transparent resin 9.

After the transparent resin 9 is applied, the optical transmission/reception module 200 is sealed such that its whole body including the transparent resin 9 is covered with the light absorption material 5b. Because the transparent resin 9 is applied in a manner not to optically couple the light receiving element 3 with the light source 6, stray light radiated outside around the light source 6 is absorbed by the light absorption material 5b covering the whole body. As a result, the stray light radiated outside around the light source 6 is not received by the light receiving element 3.

[Description of operation] Next, a description will be given of operation of the optical transmission/reception module 200, in the present exemplary embodiment, in transmission and reception.

(Operation in reception) In FIGS. 1A and 1B, an optical signal having propagated through the optical transmission line outside the module enters the optical waveguide 2c from the other end 4c, then propagates in the optical waveguide 2c, is thus guided to the light receiving element 3 via the filter 7, and is then received by the light receiving element 3. A component of emitted light from the light source 6 not having entered the optical waveguide 2d at a time of the emitted light's being incident on the optical waveguide 2d at the one end 4b becomes stray light, and propagates inside the substrate 1. If the stray light reaches the light receiving element 3 in Full-Duplex operation, there occurs deterioration of the reception sensitivity, but the stray light component propagating inside the substrate 1 is cut off by the stray light elimination section 5 before the light receiving element 3.

(Operation in transmission) Emitted light from the light source 6 enters the optical waveguide 2d at the one end 4b, then propagates in the optical waveguide 2d, and is guided by the filter 7 to the optical waveguide 2c connecting with the optical transmission line or the like outside the module. The emitted light guided to the optical waveguide 2c enters the optical transmission line outside the module, and is propagated in it. A component of the emitted light not having entered the optical waveguide 2 at a time of the emitted light's being outputted from the light source 6 to the one end 4b becomes stray light, and propagates inside the substrate 1. If the stray light reaches the light receiving element 3 in Full-Duplex operation, there occurs deterioration of the reception sensitivity, but the stray light component propagating inside the substrate 1 is cut off by the stray light elimination section 5 before the light receiving element 3.

[Description of Effect]

The optical transmission/reception module 200 corresponding to the first exemplary embodiment of the present invention has the stray light elimination section 5 in a part of the substrate 1 between the light receiving element 3 and the one end 4b. Accordingly, the optical transmission/reception module 200 can cut off stray light generated at the one end 4b when emitted light from the light source 6 is incident on the optical waveguide 2, which then propagates inside the substrate 1, before the light receiving element 3. As a result, an optical cross-talk between the light source 6 and the light receiving element 3 is suppressed, and deterioration of the reception sensitivity in Full-Duplex operation can be reduced.

Example 1

[Description of Configuration]

Figure 5A:
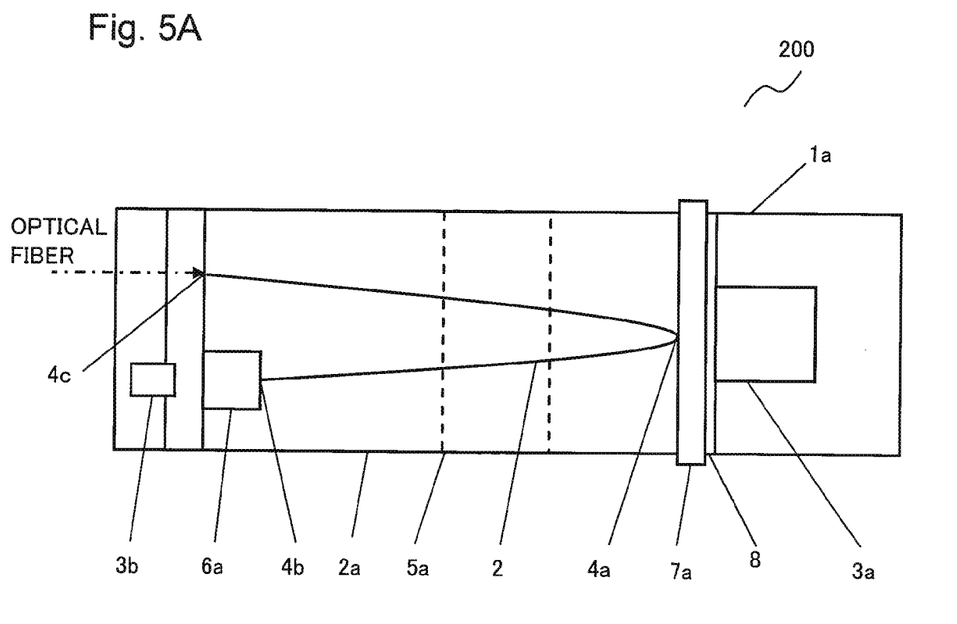
Figure 5B:
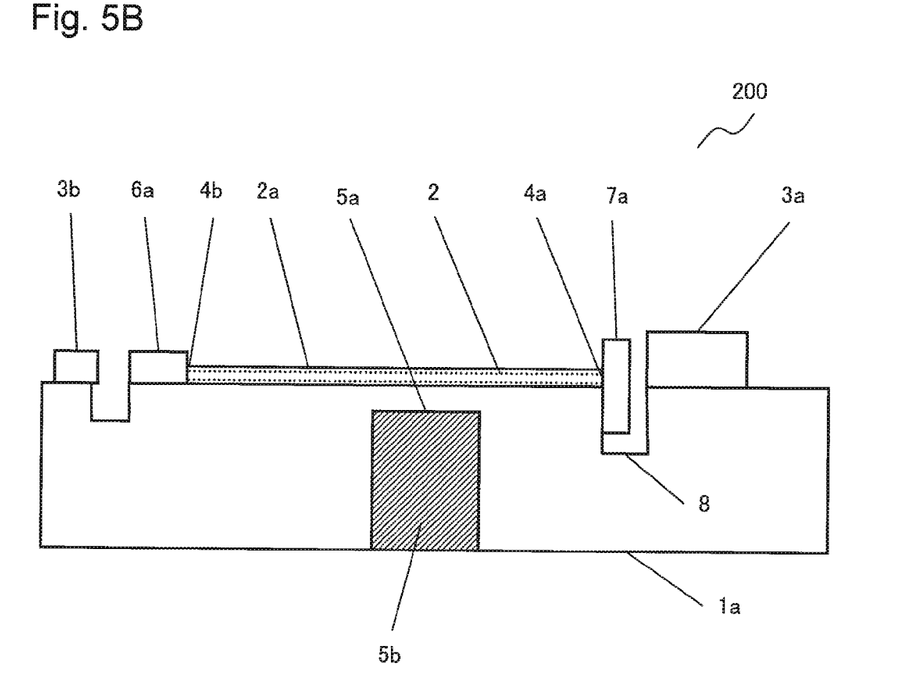

FIGS. 5A and 5B are a top view and a side view, respectively, showing an example of the optical transmission/reception module. As shown in FIGS. 5A and 5B, an $SiO_2$ layer 2a is formed on a Si substrate 1a. Also on the Si substrate 1a, an LD 6a corresponding to the light source, a reception PD 3a and a monitoring PD 3b are mounted. As an optical transmission line outside the module, an optical fiber is mounted. Here, the monitoring PD 3b is a monitoring unit which monitors light emitted from the surface (rear surface) of the LD 6a on the opposite side to one end 4b. As shown in FIGS. 5A and 5B, a recessed section 8 is provided at a turnaround point 4a of an optical waveguide 2 formed in the $SiO_2$ layer 2a on the Si substrate 1a. In the recessed section 8, a WDM filter 7a is installed at the turnaround point 4a such that light having propagated in the optical waveguide 2 from the one end 4b is reflected there and then propagates in the waveguide 2 toward the other end 4c. Further, at the bottom surface of a part of the Si substrate 1a between the one end 4b, which is optically connected with the LD 6a, and the reception PD 3a, a groove 5a is formed over the whole width of the Si substrate 1a. The groove 5a at the bottom surface of the Si substrate 1a is filled with a light absorption material 5b.

[Description of Operation]

Emitted light from the front surface of the LD 6a is coupled into and propagates in the optical waveguide 2, then totally reflected by the WDM filter 7a, and is then transmitted propagating through the optical waveguide 2 and the optical fiber outside the optical waveguide 2, which is connected with the optical waveguide 2 at the other end 4c. Monitoring light emitted from the rear surface of the LD 6a is received by the monitoring PD 3b.

On the other hand, received light having a different wavelength from that of the emitted light enters the optical fiber outside the module from a transmission line outside the module, and after propagating through the optical fiber and the optical waveguide 2, it passes through the WDM filter 7a and is then received by the reception PD 3a. The transmission by the LD 6a and the reception by the reception PD 3a can be performed simultaneously.

Out of the emitted light from the front and rear surfaces of the LD 6a, a light component not having been coupled into the optical waveguide 2 and that not having been received by the monitoring PD 3b become stray light. The stray light propagates in a space outside the $SiO_2$ layer 2a/Si substrate 1a, within the $SiO_2$ layer 2a or within the Si substrate 1a.

There occurs deterioration of the reception sensitivity if the stray light reaches the reception PD 3a, but in the present example, its reaching the reception PD 3a is prevented in the following ways. First, as shown in FIGS. 5A and 5B, the stray light component propagating in the $SiO_2$ layer 2a is cut off by covering entirely the cross section of the $SiO_2$ layer 2a facing the reception PD 3a with the WDM filter 7a, which reflects the transmission wavelength, just before the reception PD 3a. Further, the stray light component propagating in the Si substrate 1 is blocked from reaching the reception PD 3a, at the groove 5a provided at the bottom surface and filled with the light absorption material 5b, as a result of the stray light component's being reflected by a surface of the groove 5a or absorbed by the light absorption material 5b packed in the groove 5a. Further, also in the present example, the whole body of the optical transmission/reception module may be covered with the light absorption material 5*b*, similarly to in FIGS. 4A and 4B. In the present case, as portions to which the transparent resin 9 is applied, that between the monitoring PD 3*b* and the LD 6 and that of the monitoring PD 3*b* are added, besides the portions corresponding to those described in the first exemplary embodiment. As a result of the above-described ways, an optical crosstalk between the LD 6*a* and the reception PD 3*a* is suppressed, and deterioration of the reception sensitivity in Full-Duplex operation can be reduced.

The exemplary embodiment of the present invention has been described above, with reference to the exemplary embodiment and the example. However, an aspect to which the present invention is applicable is not limited to the exemplary embodiment described above. To the configurations and details of the present invention, various changes which can be understood by those skilled in the art may be made within the scope of the present invention.

The present application is based upon and claims the benefit of priority from Japanese Patent Application No. 2013-149557, filed on Jul. 18, 2013, the disclosure of which is incorporated herein in its entirety by reference.

REFERENCE SIGNS LIST 1 substrate
1*a* Si substrate
2, 2*c*, 2*d* optical waveguide
2*a* SiO$_2$ layer
3 light receiving element
3*a* reception PD
3*b* monitoring PD
4*a* turnaround point
4*b* one end
4*c* the other end
5 stray light elimination section
5*a* groove
5*b* light absorption material
6 light source
6*a* LD
7 filter
7*a* WDM filter
8 recessed section
9 transparent resin
101 optical waveguide
102 thin plate
103 light absorption section
104 substrate
105 triangular groove
200 optical transmission/reception module

The invention claimed is:

1. An optical transmission/reception module comprising:
a substrate;
a light receiving element provided on the substrate;
a light source provided on the substrate;
an optical waveguide formed on the substrate and having a turnaround point; and
a filter arranged between the optical waveguide and the light receiving element,
wherein:
the optical waveguide is optically connected with the light source at its one end and with the light receiving element at the turnaround point;
a stray light elimination section is provided in a part of the substrate between the light receiving element and the one end of the optical waveguide; and
wherein the stray light elimination section comprises one in which grooves are arranged alternately at one and the other side surfaces of the substrate.

2. The optical transmission/reception module according to claim 1, wherein the stray light elimination section is arranged in a part of the substrate between the light receiving element and the one end of the optical waveguide, in a manner to cross over the optical waveguide.

3. The optical transmission/reception module according to claim 2, wherein the stray light elimination section is arranged in a part of the substrate between the light receiving element and the one end of the optical waveguide and that between the light receiving element and the other end of the optical waveguide, in a manner to cross over the optical waveguide.

4. The optical transmission/reception module according to claim 2, wherein the stray light elimination section is arranged to extend over the whole width of the substrate.

5. The optical transmission/reception module according to claim 2, wherein the stray light elimination section comprises a groove.

6. The optical transmission/reception module according to claim 1, wherein the stray light elimination section is arranged in a part of the substrate between the light receiving element and the one end of the optical waveguide and that between the light receiving element and the other end of the optical waveguide, in a manner to cross over the optical waveguide.

7. The optical transmission/reception module according to claim 6, wherein the other end is connected with an optical transmission line outside the module.

8. The optical transmission/reception module according to claim 6, wherein the stray light elimination section is arranged to extend over the whole width of the substrate.

9. The optical transmission/reception module according to claim 6, wherein the stray light elimination section comprises a groove.

10. The optical transmission/reception module according to claim 1, wherein the stray light elimination section is arranged to extend over the whole width of the substrate.

11. The optical transmission/reception module according to claim 10, wherein the stray light elimination section comprises a groove.

12. The optical transmission/reception module according to claim 1, wherein the grooves are each filled with a light absorption material or a high refractive index material.

13. The optical transmission/reception module according to claim 1, wherein at least part of a top surface of the optical transmission/reception module is covered with a light absorption material.

14. The optical transmission/reception module according to claim 1 further comprising a monitoring unit for monitoring output of the light source.

* * * * *